Nov. 13, 1962

H. L. TOFT 3,063,723

BROADCAST SPREADER

Filed April 3, 1958

Howard L. Toft
INVENTOR.

BY *Clarence A. O'Brien*
and *Harvey B. Jackson*
Attorneys

Nov. 13, 1962     H. L. TOFT     3,063,723
BROADCAST SPREADER
Filed April 3, 1958     6 Sheets-Sheet 2

Howard L. Toft
INVENTOR.

United States Patent Office 3,063,723
Patented Nov. 13, 1962

3,063,723
BROADCAST SPREADER
Howard L. Toft, 203 Mead, Caldwell, Idaho
Filed Apr. 3, 1958, Ser. No. 726,250
5 Claims. (Cl. 275—5)

The present invention generally relates to a feed mixing and spreading apparatus and more particularly to a mobile feed mixer having a spreader attachment adapted to be mounted on the mixer so that the mixer may be readily converted into a broadcast spreader suitable for spreading many types of material other than feed.

An object of the present invention is to provide a mobile feed mixer in the form of an enlarged vehicle body having a conveyor forming a part of the bottom thereof for moving layered feed material longitudinally of the vehicle body together with mixers at one end of the body and a lateral discharge conveyor for discharging the mixed feed laterally of the vehicle body so that the vehicle may be driven alongside of a feed trough for discharging the feed into the trough after the feed has been thoroughly mixed.

A further object of the present invention is to provide a movile feed mixer with a spreader attachment which is movable into an operative position when desired thus enabling the operator to convert the feed mixer to a broadcast spreader which may be used for broadcasting other materials than feed.

A further object of the present invention is to provide a mobile feed mixer with spreader attachment in accordance with the preceding objects in which the bottom forming conveyor is of the slat type and means is provided for wiping the slats for assuring that very little if any material will continue around the path of movement of the conveyor slats.

Another object of the present invention is to provide a feed mixer having a spreader attachment which is extremely simple in construction, efficient in operation, effective for its particular purposes, relatively inexpensive to manufacture and capable of many utilities.

These together with other objects and advantages which will become subsequently apparent reside in the details of construction as more fully hereinafter described and claimed, reference being had to the accompanying drawings forming a part hereof, wherein like numerals refer to like parts throughout, and in which:

Referring now specifically to the drawings, the numeral 10 generally designates the mobile feed mixer of the present invention which incorporates an enlarged receptacle or box generally designated by the numeral 12 which is mounted on a longitudinally elongated truck frame 14 having ground engaging supporting and grinding wheels 16 mounted thereon in a conventional manner. The truck frame 14 is provided with a cab and front steerable wheels in a conventional manner and this construction is not shown since the details of the truck and truck frame are no part of the present invention. In fact, the running gear of the device may be any conventional and commercially available truck body and chassis.

The box or receptacle 12 includes a pair of vertically disposed and substantially parallel side walls 18 and 20 having the rear ends thereof interconnected by a rear wall 22 and having the front ends thereof interconnected by a front wall 24 of a novel construction.

The receptacle 12 is supported on frame rails 26 mounted on the truck frame members 14 with the frame rail members 26 being interconnected by transverse supporting rail members 28 sitting on top of the frame rail members 26. A bottom wall 30 is provided in the receptacle and is attached to the side walls 18 and 20 and also attached to the rear wall 22 and axially extends through a slot 32 in the rear wall 22 and is provided with a screw threaded fastener bolt 34 extending through the free end thereof and into a supporting ledge member 36 whereby the bottom member 30 may be moved longitudinally outwardly since it is slidably mounted on the top of the transverse frame rail 28 and slidingly engages the side walls 18 and 20.

Figure 4:
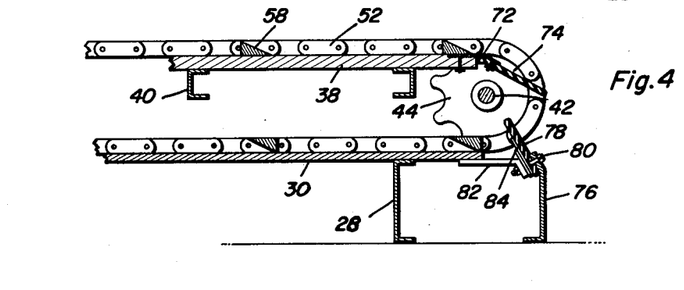
FIGURE 4 is an enlarged sectional view of the discharge end of the conveyor illustrating the construction of the wiper elements for the slats.

Disposed in spaced parallel relation to the removable bottom 30 is a false bottom 38 supported on a plurality of transverse frame rails 40 interconnecting the side walls 18 and 20. Adjacent the front of the receptacle 12 is a transverse shaft 42 which has a pair of sprocket wheels or gears 44 mounted thereon. Adjacent the rear of the receptacle 12 is a transverse shaft 46 having a pair of sprocket wheels or gears 48 thereon in alignment with the sprocket gears 44 for receiving a slat type conveyor assembly generally designated by the numeral 50 and including a pair of endless sprocket chains 52 encircling the sprocket gears 44 and 48 respectively with there being a plurality of transversely extending slats 54 disposed between the sprocket chains 52. Each of the slats 54 is provided with a flat inner surface and one vertical edge and an inclined surface designated by the numeral 58 and illustrated specifically in FIGURE 4 for a purpose described hereinafter. The upper flight of the conveyor 54 moves along the upper surface of the false bottom 38 while the lower flight of the conveyor 50 moves along the upper surface of the bottom member 30.

Figure 5:
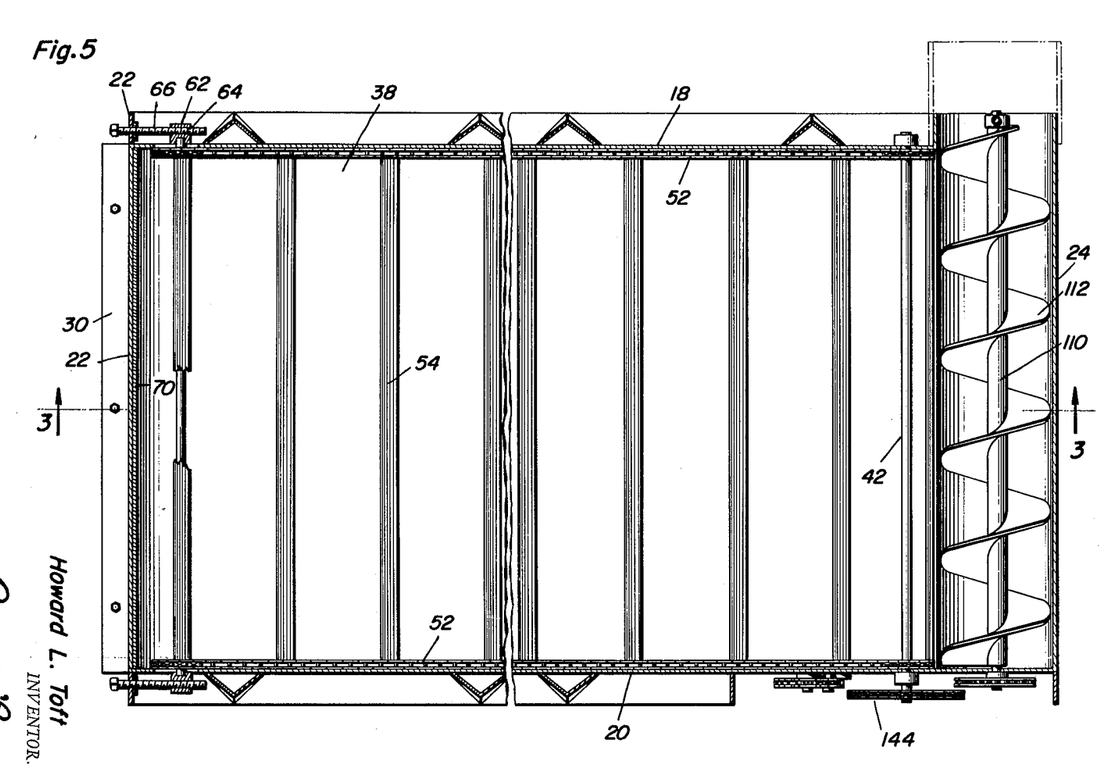
FIGURE 5 is a plan sectional view taken substantially upon a plane passing along section line 5—5 of FIGURE 3 illustrating further structural details of the bottom conveyor mechanism as well as the lateral conveyor and showing the lateral conveyor extension in phantom.

As illustrated in FIGURE 5, each end of the axle or shaft 46 extends through a slot 60 in the side walls 18 and 20 and terminates in an adapter block 62 having a screw threaded aperture 64 extending therethrough for receiving an elongated screw threaded bolt 66 which is in rotational engagement with the rear wall 22 whereby rotation of the threaded member 66 will cause longitudinal movement of the adapter block 62 thus tensioning the conveyor chains 52 to the desired tension and enabling the tension to be adapted and also enabling movement of the shaft 46 for permitting removal of the sprocket chain or loosening thereof when desired.

Adjacent the rear of the receptacle or box 12 is an arcuately curved plate or guide 68 extending between the side walls 18 and 20 and extending upwardly from the bottom wall 30 with the bottom edge of the arcuate member 68 slidably engaging the top of the bottom 30 and generally conforming to the path of movement of the slats 54 thus providing a guide for the slats 54 and also providing a rounded surface whereby the material will be scooped therefrom by the slats thus providing for removal of substantially all of the material from the rear end of the receptacle towards the front end thereof. Extending between the side walls 18 and 20 adjacent to the rear wall 22 is a deflector plate 70 which angulates forwardly and downwardly and terminates immediately above the upper flight of the conveyor 50 whereby the material deposited in the receptacle 12 will be guided downwardly onto the upper flight of the conveyor 50 without any danger of this material being disposed in an inaccessible area.

Mounted on the forward end of the conveyor assembly 50 is a bracket 72 attached to the false bottom 38 and extending forwardly therefrom with there being provided a forwardly extending resilient plate or scraper member 74 of rubber material or a similar material which extends towards the extremity of the path of movement of the slats whereby the scraper 74 will engage the flat inner surface of each of the slats 58 thus wiping any material from this surface. An upstanding bracket 76 is disposed forwardly of the forward transverse frame rail 28 and includes an upwardly extending rubber scraper element of resilient material such as rubber or the like and designated by the numeral 78 which is secured to the bracket 76 by a fastening bolt 80. A bracket 82 is also attached to the bolt 80 and extends under and engages the undersurface of the forward end of the bottom member 30. Disposed against one surface of the scraper blade 78 is a metallic reinforcing and resilient member 84 with the free edge of the plate extending into the path of movement of the conveyor slats 58 and being inclined in the direction of movement thereof whereby the free edge and facing surface of the resilient plate member 78 will engage the inclined surface of the slats thus wiping the inclined surface completely free of feed or whatever material is being carried forwardly within the receptacle 12. It may also be pointed out that the receptacle 12 is provided with top flanges 86 and bottom flanges 88 together with tapering reinforcement members 90 extending therebetween. Also, longitudinally extending and vertically spaced ladder runs 92 may be attached to the central of the reinforcing members 90. Also, a protective shield in the form of a fender or dust guard 94 may be provided for overlying the vehicle wheels 16.

The front wall 24 of the receptacle 12 is provided with a rearwardly curved upper end 96 terminating in a rolled edge 98 conforming generally to upstanding rounded portions 100 on the front of the side walls 18 and 20. The bottom edge of the front wall 24 extends downwardly below the bottom 30 and is interconnected by depending portions of the side walls designated by the numeral 102 with the lower end of the front wall 24 terminating in a semi-cylindrical portion 104 having the free edge thereof terminating against the front surface of the bracket 76. The side wall 18 is provided with an enlarged opening 106 defined by an outwardly extending oval shaped projecting wall 107. Disposed in the semi-cylindrical portion 104 is a screw auger generally designated by the numeral 108 and including an elongated shaft 110 and a spiral flighting 112 thereon. One end of the shaft 110 is provided with an axial extension 114 extending through the sidewall 20 and provided with a sprocket gear 116 on the outer end thereof. The other end of the shaft 110 is provided with a reduced axial extension 118 which is journaled in a bearing 120 supported by a tubular member 122 extending through the flange 107 and being rigidly secured to a horizontally disposed bracket 124 secured in position by brace members 126 thus enabling the outer end of the screw auger conveyor 108 to be supported so that upon rotation of the screw auger conveyor 108, material will be discharged laterally through the opening defined by the flange 107.

Disposed above and slightly rearwardly of the conveyor 108 and slightly rearwardly of each other is a pair of transversely extending cylindrical members 128 and 130 with the cylindrical member 130 being slightly behind but above the cylindrical member 128. Each of the cylindrical members 128 and 130 is provided with a plurality of radially extending cutting blades 132 which act to completely mix and cut the feed material as it is brought forwardly by the conveyor 50. Normally, the feed material is positioned in the box in layers so that thorough agitation of the feed will take place when passing through the blades 132 thereby providing a more homogenous mixture of feed. Each of the cylindrical members 128 and 130 is provided with a reduced stub shaft 134 extending through the respective side walls 18 and 20 with one of the stub shafts 134 being secured by a retainer 136 and the other end thereof being provided with a sprocket drive gear 138 with the sprocket drive gears 138 being in alignment with the sprocket drive gear 116 for the screw auger conveyor 108.

Figure 1:
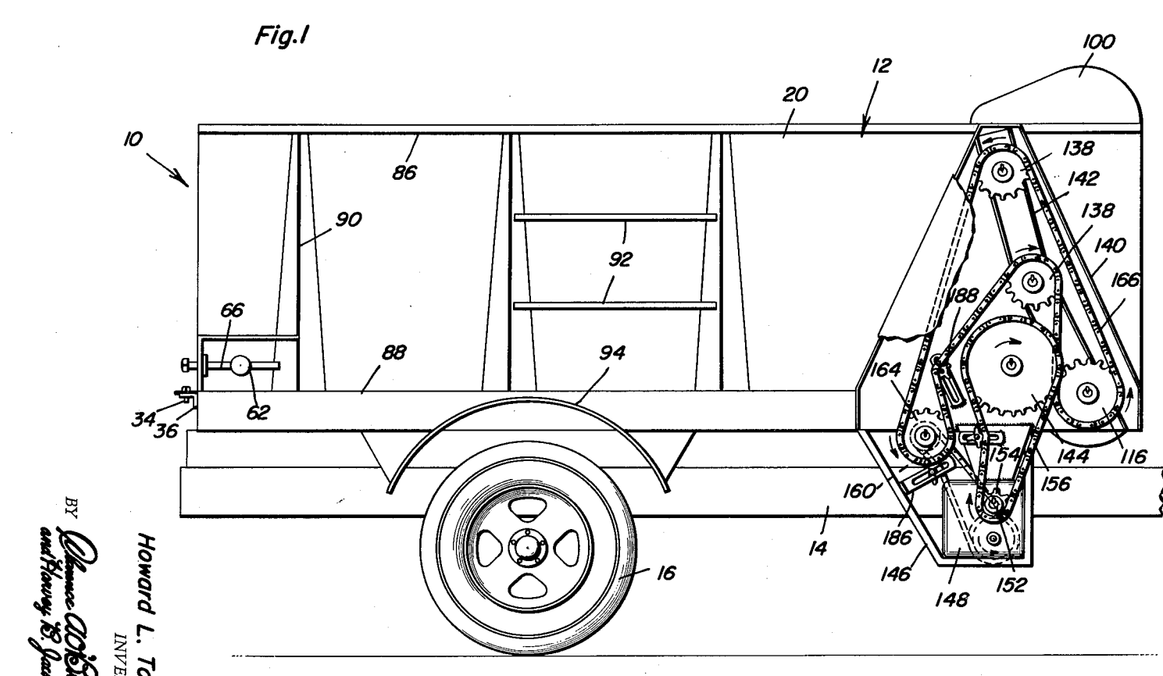
FIGURE 1 is a side elevation of the mobile feed mixer of the present invention with the cab portion of the vehicle broken away and also parts of the cover for the gear train drive for illustrating the construction and relationship of the drive mechanism.
Figure 2:
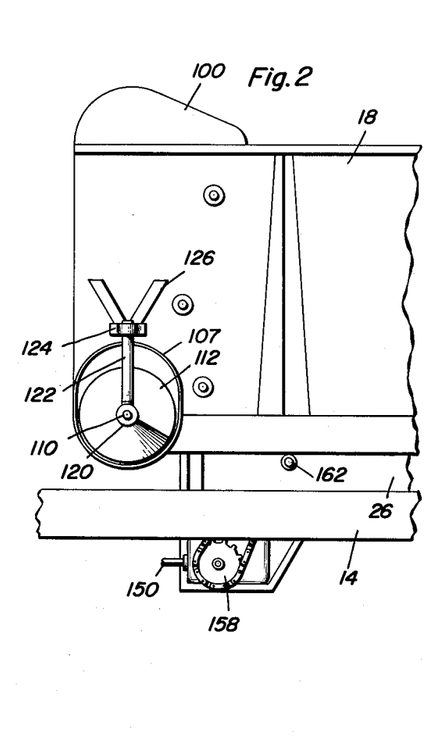
FIGURE 2 is a partial side elevation of the other side of the feed mixer illustrating the discharge end of the lateral conveyor.

Reference is made to FIGURE 1 in which the drive mechanism for the conveyor 50, the lateral conveyor 108 and the beaters or agitators 132 are illustrated as being enclosed in a cover 140 with the side wall 20 being reinforced by a channel shaped iron member 142 forming a bearing for the various shafts. The shaft 42 forming the front end of the conveyor 50 extends through the side wall 20 and is provided with an enlarged sprocket gear 144. Supported beneath the longitudinal frame rails 26 by a supporting bracket 146, there is a power transfer case 148 having an input shaft 150 adapted to be connected to the power take-off of a vehicle and including an output shaft 152 having a sprocket gear of relatively small construction 154 thereon with the sprocket gear 154 being in alignment with the gear 144 and provided with a sprocket chain 156 encircling the gears 154 and 144 thus driving the sprocket gear 144 in a clockwise manner thus rotating the shaft 42 in a clockwise manner for driving the upper flight of the conveyor 50 forwardly for depositing and urging the layered feed into the agitators and into the laterally extending conveyor. The power transfer case 148 is also provided with a drive sprocket gear 158 in alignment with a smaller sprocket gear 160 mounted on and rigid with a transverse idler shaft 162 journaled in the frame rails 26 and which carries a larger sprocket drive gear 164 in alignment with the sprocket gears 138 and 116. An endless sprocket chain 166 encircles the sprocket gear 164 as well as the gear 138 and thence downwardly and around and under the gear 116 and then upwardly and over the lower sprocket gear 138 as illustrated in FIGURE 1 thus driving the agitators or the sprocket gears 138 in opposite directions with the lateral conveyor 108 serving to move material disposed therein laterally outwardly through the discharge opening 106.

Figures 6, 7:
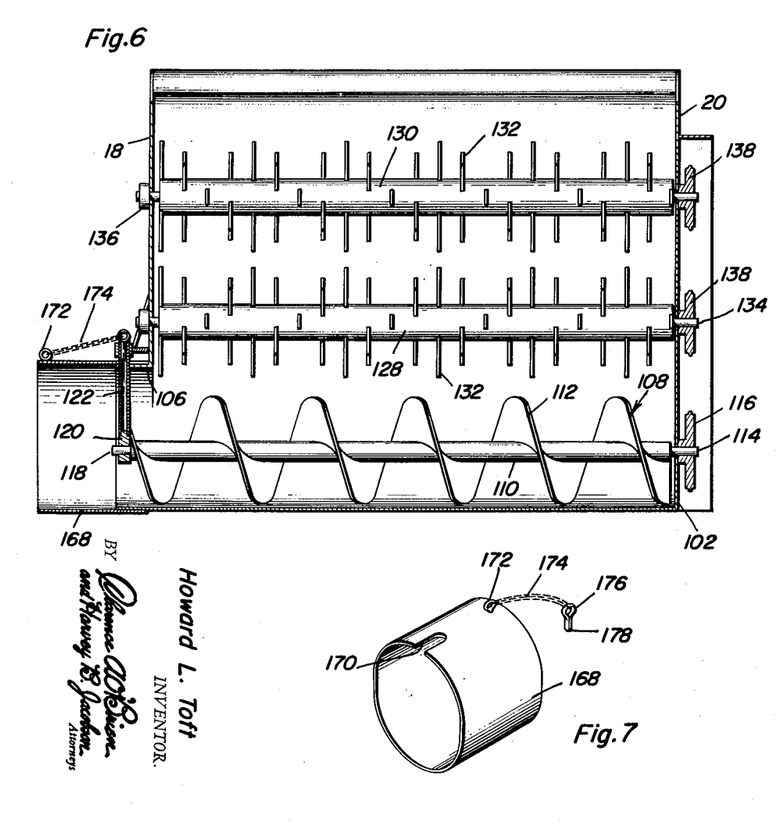
FIGURE 6 is a vertical sectional view taken substantially upon a plane passing along section line 6—6 of FIGURE 3 illustrating the construction and arrangement of the beaters and lateral conveyor at one end of the mobile feed mixer together with the removable extension for the lateral conveyor.
FIGURE 7 is a perspective view of the removable lateral extension for the conveyor.

Mounted on the oval-shaped wall 107 which defines the opening 106 is an oval-shaped extension 168 having a notch 170 in one end thereof with the oval-shaped extension 168 slidable over the oval-shaped flange 107 with the notch 170 receiving the tubular support member 122 whereby the inner edge of the extension 168 may abuttingly engage the side wall 18 as shown in FIGURE 6. Adjacent the outer end of the oval-shaped extension 168 is an eye member 172 having a flexible chain 174 connected thereto. The chain 174 is connected to an eye member 176 on the upper end of a peg or pin 178 which is of a diameter to fit within the open upper end of the tubular support 122 thereby locking the extension 168 in position and preventing accidental disengagement thereof with this orientation of elements and structure being clearly shown in FIGURE 6 whereby it will be necessary to lift the pin 178 out of the upper end of the tubular support 122 before the extension 168 can be removed. The extension 168 facilitates the discharge of feed material laterally of the receptacle into a feed trough or the like.

Figure 8:
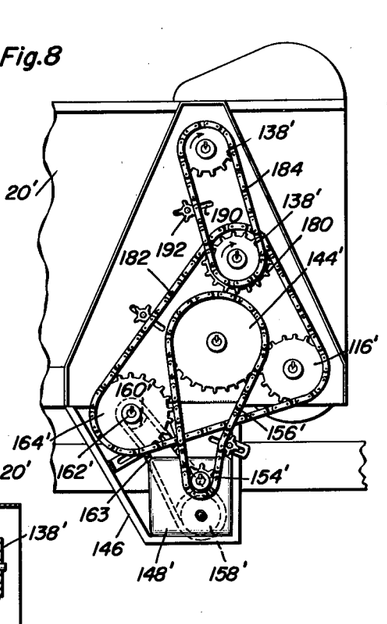
FIGURE 8 is a partial side elevation similar to a part of FIGURE 1 illustrating a modified driving arrangement for the beaters.

Referring now specifically to FIGURE 8 of the drawings, another driving arrangement is herein illustrated. In this driving arrangement, the power transfer case 148′ is provided with the small power output sprocket 154′ which is in alignment with the drive sprocket 144′ for the bottom conveyor which is encircled by a sprocket chain 156′ which is the same construction as the device in FIGURE 1. The larger power output sprocket 158′ is in alignment with the small sprocket 160′ on the transverse shaft 162′ and is encircled by a sprocket chain 163. This drives the shaft 162′ and the sprocket drive gear 164′ which is in alignment with the sprocket gear 116′ on the lateral conveyor and a second sprocket gear 180 mounted inwardly of the lower sprocket gear 138′ for the lower beater with the sprocket gears 116′, 180 and 164′ being encircled and driven by the sprocket chain 182. The lower sprocket 138′ is in alignment with the upper sprocket 138′ and these two sprockets are encircled by a sprocket chain 184 thus driving the two beaters in the same direction and at the same speed.

It may be mentioned in connection with both FIGURES 1 and 8 that chain tightening mechanisms are provided for each of the sprocket chains and these may be in the form of brackets 186 which are slotted and provided with slidable idler sprocket gears 188 which are capable of being mounted in adjusted position for varying the tension of the sprocket chain. In lieu of this, slots may actually be provided in the walls of the housing with the slots being designated by the numeral 190 for also slidably receiving idler sprockets 192 for varying the tension of the sprocket chains.

Figure 3:
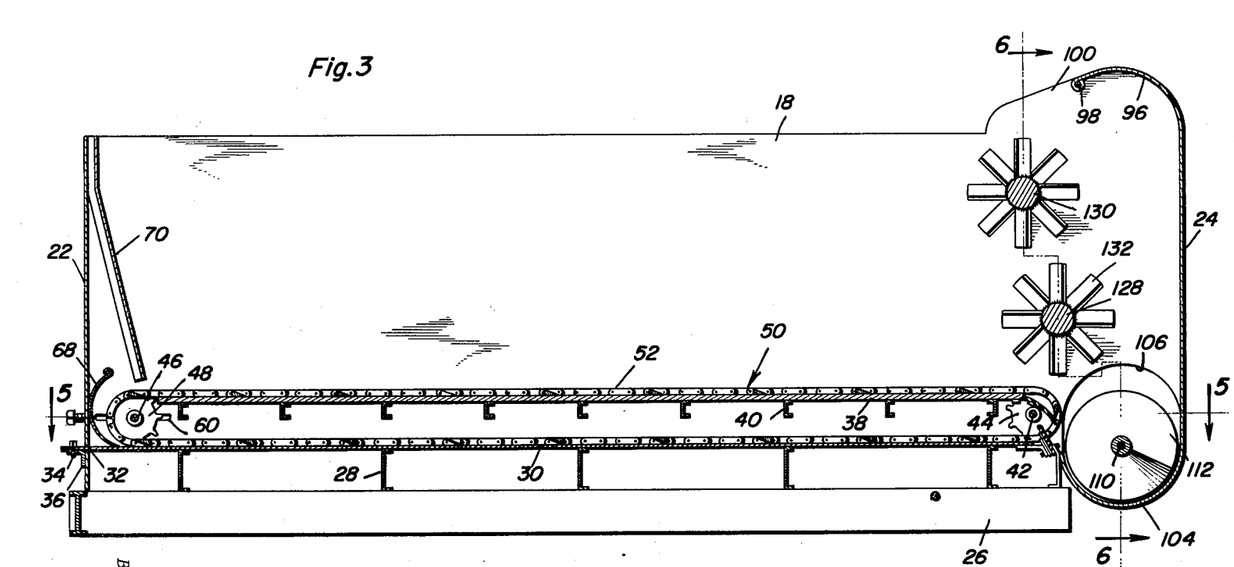
FIGURE 3 is a longitudinal, vertical sectional view taken substantially upon a plane passing along section line 3—3 of FIGURE 5 illustrating the structural details of the interior of the feed mixer and especially the receptacle thereof together with the conveyor forming the bottom of the receptacle.
Figure 9:
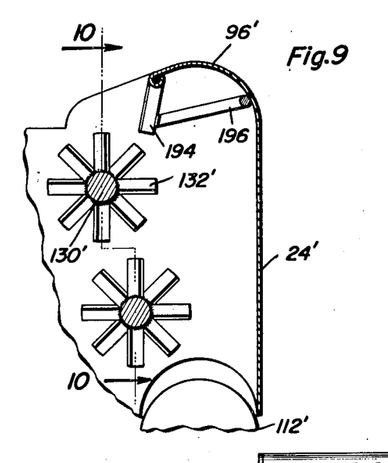
FIGURE 9 is a detailed sectional view illustrating the front part of the receptacle for showing a series of stationary blades disposed in staggered relation to the blades on the beaters for more thoroughly chopping certain types of material.
Figure 10:
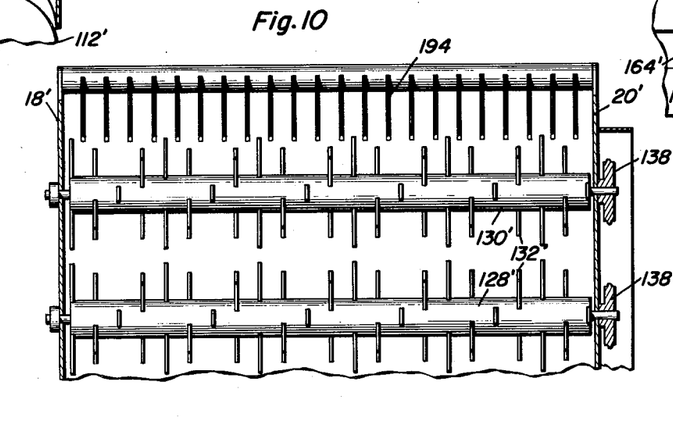
FIGURE 10 is a sectional view taken substantially upon a plane passing along section line 10—10 of FIGURE 9 illustrating the relationship between the stationary blades and the rotating blades on the beaters.

FIGURES 9 and 10 illustrate another modified form of invention in which stationary cutter blades 194 are mounted on the rear edge of the reversely curved part of the front wall which has been designated in FIGURE 3 by the numeral 96 and which is designated in FIGURE 9 by the numeral 96′. The depending blades 194 are in staggered relation to the blades 132′ on the cylindrical member 130′ and are arranged above and slightly forwardly of these blades. The bottom edges of the blades are braced by brace members 196 thus rigidifying the blades so that the clockwise movement of the blades 132′ will cause a cutting action to be exerted on material disposed between the blades 132′ and the blades 194. This arrangement is especially useful in chopping coarse roughage and is especially advantageous when using the drive illustrated in FIGURE 8. These knives or bars actually momentarily retain large slugs of roughage from going over the top beater at one time thus providing a more even flow of material into the laterally extending screw auger conveyor and providing a more effective mixing of this type of feed material as well as a more effective chopping thereof so that the same may be more easily consumed by animals.

Figure 11:
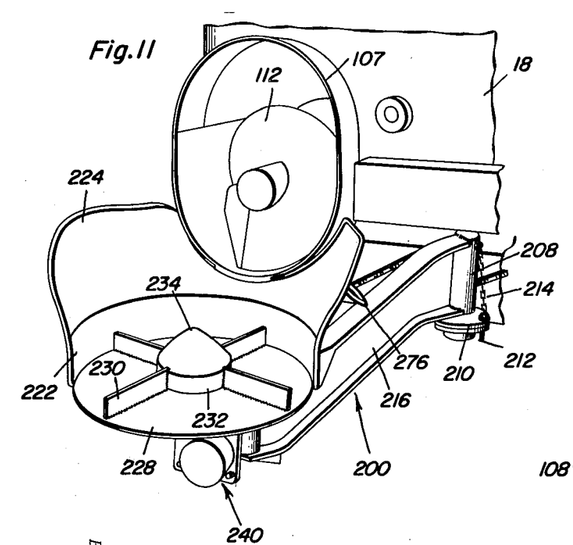
FIGURE 11 is a perspective view of the discharge end of the lateral conveyor with the spreader attachment mounted in operative position for receiving material from the lateral conveyor.
Figure 12:
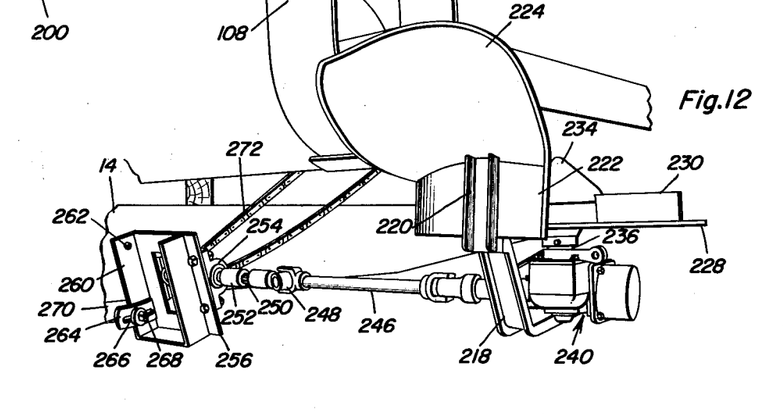
FIGURE 12 is a perspective view of the present invention taken from a point located towards the front of the vehicle.
Figure 13:
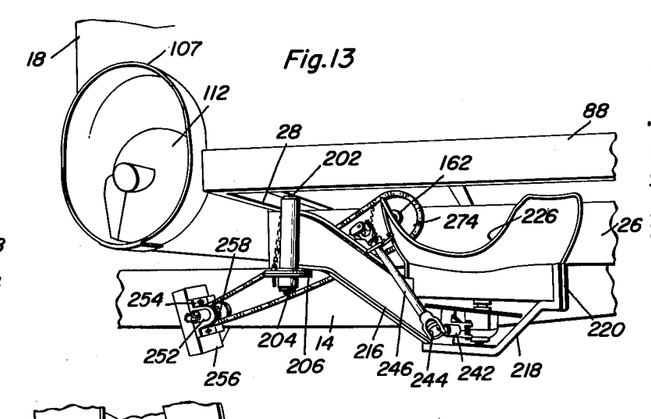
FIGURE 13 is a perspective view similar to FIGURE 11 but with the spreader swung to an inoperative position.

Referring now specifically to FIGURES 11–13, the numeral 200 generally designates the spreader attachment of the present invention which is swingably mounted for pivotal movement about a vertical axis from an operative position in which the spreader underlies the discharge end of the laterally extending conveyor to an inoperative position in which it is formed inwardly into underlying relation to the bottom of the receptacle. The same reference numerals will be used to identify the same parts in FIGURES 11–13 as used in FIGURES 1–7.

Rigidly secured to and depending vertically from one of the forward transverse supporting rails 28 is a vertically disposed pin or rod 202 having a cap 204 with a flange 206 thereon rigid with the lower end. A cylindrical sleeve 208 is rotatable on the rod 202 and is provided with a flange 210 on the lower end thereof rotatably engaging the flange 206 thereby providing a bearing for the sleeve 208. The flanges 206 and 210 are provided with alignable apertures for receiving a lock pin 212 which is mounted on a flexible chain 214 having one end thereof attached to the cylindrical sleeve 208. The plate or flange 206 is provided with a pair of apertures spaced circumferentially approximately 90° so that the spreader attachment may be locked in operative and inoperative positions as described hereinafter.

Rigid with and extending outwardly and downwardly from the sleeve 208 is a supporting arm 216 which is of I-beam shape. Extending outwardly from the terminal end of the arm 216 is a bracket member 218 having an upturned free end 220 for attachment to and support of a partial cylindrical member 222. The upper edge of the partial cylindrical member 222 is provided with an arcuate shield 224 having a recessed portion 226 in the upper edge thereof which conforms generally with the lower edge of the oval-shaped flange 107 and which will closely underlie the lower surface or edge of the flange 107 with the shield 224 forming a guide for the material discharged from the opening 106 by the lateral conveyor or whereby the material will then fall downwardly onto a rotatable spreader plate 228 having a plurality of radially extending upstanding fins or blades 230 thereon which are rigid with the plate 228 and which radiate from a central hub 232 having a cone-shaped upper surface 234 which will tend to divide the material discharged onto the plate 228 and tend to spread the same outwardly.

The plate 228 is supported on and rigid with an output shaft 236 of a gear box or transfer case generally designated by the numeral 240 which is rigidly supported on the arm and bracket and which includes a power input shaft 242 extending horizontally and in perpendicular relation to the output shaft 236. The power transfer case 240 may be a speed reduction mechanism of any suitable type for providing the desired rotary speed to the broadcasting plate 228.

The input shaft 242 is connected with a universal joint 244 and a short drive shaft 246 having another universal joint 248 on the other end thereof together with a splined detachable connection 250 outwardly of the universal coupling 248. The male portion of the splined coupling 250 forms part of a power shaft 252 mounted on bearings 254 supported on a bracket 256 with the shaft 252 having a sprocket gear 258 mounted thereon between the bearings 252. The bracket 256 is provided with a pair of laterally extending flanges 260 with the upper end of the inner flange being pivotally connected to the truck frame member 14 by a pivot bolt 262 whereby the bracket 256 may pivot about the transverse axis formed by the pivot bolt 262. The lower end of the same flange is provided with an arcuate strap 264 having an arcuate slot 266 therein for receiving a fastening bolt 268 extending into a depending lug 270 rigid with the truck frame member 14 whereby the angular position of the bracket 256 may be adjusted by loosening the bolt 268 and moving the bracket to the desired position and then tightening the same. A drive sprocket chain 272 encircles the sprocket gear 258 and also encircles a sprocket gear 274 mounted on the end of the transverse idler shaft 162 extending through the longitudinal frame rails 26. With the device locked in operative positions, the shaft 250, drive shaft 248 and input shaft 242 are all in general longitudinal alignment with the plate 228 being driven from the transverse shaft 162. The material will be discharged from the lateral conveyor onto the rotating plate 228 whereby the radial fins 230 will cause the material to be broadcast. When it is desired to use the device without the broadcast attachment or when it is desired to drive the vehicle over the road, it is only necessary to remove the pin 212 and swing the arm 216 about the pivot axis formed by the depending rod 202. Inasmuch as the depending rod 202 is disposed rearwardly of the discharge end of the lateral conveyor and due to the spacing between the recess 226 and the lower edge of the oval-shaped flange 108, the shield 224 will move in an arcuate path which is initially outwardly of the flange 108 and then will swing inwardly into underlying relation to the receptacle as shown in FIGURE 13. When the broadcast attachment is moved to an inoperative condition, the drive shaft 246 will be disconnected at the splined coupling 250. This drive shaft 246 is then supported in stored position by a loop-shaped member 276 mounted on the arm 216 which will provide means for hooking the drive shaft 246 in an out-of-the-way and in a supported condition.

The broadcast spreading attachment for the feed mixer permits the operator of the assembly to quickly change the feeder into a broadcast spreader suitable for spreading many types of material such as sawdust, shavings, lime, fertilizer, barn yard manure or the like. The particular construction of the vanes or fins may be varied as to the type of material being spread with the basic concept incorporating the attachment which can be moved from an operative to an inoperative position. The lock pin 212 has been illustrated as a manually operated type but it may be of the spring loaded type which will automatically drop into locked position when the arm is swung to an operative or an inoperative position. The shield 224 along with the cylindrical portion 222 causes all of the material to be spread outwardly away from the vehicle thus guiding the material being spread.

In the operation of the present invention, layers of various feeds are placed in the blocks or receptacles in a superimposed manner with this feed being received from various chutes, hoppers or any other containers. With the mixer in operation, the layered load moves forwardly by virtue of the bottom conveyor 50 into the upper and lower beaters which are either rotating towards each other or rotating in the same direction. These beaters mix the layered material into a homogeneous mixture and this mixture drops into the lateral conveyor and is delivered out of the left front corner of the receptacle into the bunk or feed box or trough. The upper beater is set back or disposed slightly rearwardly of the lower beater to prevent caving off of the load and uneven delivery of feed. The power transfer device may be in the form of a transmission or other speed changing mechanism may be employed for varying the speed of the bottom conveyor 50 or for varying speed of the other elements for varying the speed of discharge of the mixed feed. The rubber scraper flaps are used to keep the feed from following the chain slat assembly on its return to the back end and any material that does happen to move with the lower flight of the conveyor will be brought into the interior of the receptacle above the upper flight by the rounded shield at the rear of the conveyor.

The arrangement of the mixer blades may vary and they may be sharpened so that the leading edge will have a tendency to cut and shred coarse, rough material before it falls into the auger. The blades may be placed on the mixer shaft in a spiral arrangement as illustrated in FIGURE 6 so that the bottom mixer will auger or spiral in the opposite direction to the top mixer which will tend to give a more thorough mixture of the feed. Thus a driver or operator of a vehicle may drive the same alongside of a feed bunk or trough and cause operation of the mixer and discharge the mixed feed directly into the feed bunk due to the lateral discharge of the lateral conveyor and also the extension may be used if the feed bunk is so arranged that the vehicle cannot be driven sufficiently close thereto. The length of the extension may vary in each individual installation depending upon the characteristics of the feed bunk and the facility with which the vehicle can be brought into proximity thereto. In using the mixer for other purposes, the spreader attachment may be moved to an operative position wherein the material may be broadcast and also mixed. This is especially desirable when spreading barnyard manure, fertilizer, or any other material desired to be chopped and mixed before discharging onto the ground surface.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A broadcast spreader device comprising an arm, means supporting the arm for swinging movement in a horizontal plane about a substantially vertical axis from an operative to an inoperative position, a plate rotatably mounted on the outer end of the arm and being substantially horizontally disposed, means for rotatably driving said plate for rotation about a vertical axis, a plurality of upstanding fins on the upper surface of said plate and extending radially for receiving material from a source of supply and causing the same to be broadcast radially outwardly, stationary shield means including an upwardly and outwardly tapering wall portion for guiding material onto the plate and extending partially around the rotatable plate for guiding the material discharged therefrom outwardly in a single direction, and manually releasable latch means retaining the arm and rotatable plate in both the operative and inoperative positions, said plate having a central conical hub forming a divider for spreading material onto the rotating plate.

2. A broadcast spreading device in combination with a hopper having a discharge conveyor and including an open ended housing defining a discharge end for the conveyor, said spreading device including a rotatable plate, an arm supporting the plate movably in relation to the discharge end of the conveyor for movement of the plate to an underlying relation to the discharge end of the conveyor and to a position underlying the hopper whereby the spreading device may be retracted when not in use, said arm including an upwardly and outwardly inclined shield for guiding material onto the plate from the discharge end of the conveyor, said shield including an arcuate member extending substantially around one-half of the periphery of the plate for discharging material outwardly in an uncontrolled manner, the upper edge of the shield conforming generally with the discharge end of the housing for receiving material therefrom.

3. The combination as defined in claim 2 together with drive means disposed under the hopper and connected with the rotatable plate for causing rotation of the plate, said drive means being rendered ineffective when the arm and rotatable plate swing to a retracted position underlying the hopper.

4. The combination as defined in claim 2 wherein said rotatable plate is provided with radially extending upstanding flanges thereon, and an upwardly projecting member having cylindrical cross-sectional configuration disposed on the rotatable plate for dividing the material discharged thereon.

5. The combination as defined in claim 2 together with means for locking the arm in perpendicular relation to the hopper for supporting the plate underlying the discharge end of the conveyor and also for locking the arm in retracted position with the plate disposed under the hopper.

References Cited in the file of this patent

UNITED STATES PATENTS

| | | |
|---|---|---|
| Re. 19,801 | Mosgrove | Dec. 31, 1935 |
| 1,012,795 | Barth | Dec. 26, 1911 |
| 1,561,866 | Larkin | Nov. 17, 1925 |
| 1,644,031 | Pulliam | Oct. 4, 1927 |
| 1,815,042 | Bartels | July 21, 1931 |
| 2,489,633 | Fulgham | Nov. 29, 1949 |
| 2,661,955 | Sherer | Dec. 8, 1953 |
| 2,676,002 | Wolfe | Apr. 20, 1954 |
| 2,696,977 | Baldridge et al. | Dec. 14, 1954 |
| 2,697,609 | Chase | Dec. 21, 1954 |
| 2,743,832 | Kappelmann | May 1, 1956 |
| 2,822,946 | Van Drisse | Feb. 11, 1958 |